(12) United States Patent
Zhao et al.

(10) Patent No.: US 12,450,305 B2
(45) Date of Patent: Oct. 21, 2025

(54) SYSTEMS AND METHODS FOR MAINTAINING A SITEMAP

(71) Applicant: Walmart Apollo, LLC, Bentonville, AR (US)

(72) Inventors: Xia Zhao, Santa Clara, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 80 days.

(21) Appl. No.: 18/224,875

(22) Filed: Jul. 21, 2023

(65) Prior Publication Data

US 2023/0367839 A1    Nov. 16, 2023

Related U.S. Application Data

(63) Continuation of application No. 17/589,800, filed on Jan. 31, 2022, now Pat. No. 11,709,909.

(51) Int. Cl.
*G06F 16/958* (2019.01)
*G06F 16/906* (2019.01)

(52) U.S. Cl.
CPC .......... *G06F 16/958* (2019.01); *G06F 16/906* (2019.01)

(58) Field of Classification Search
CPC ....................... G06F 16/9024; G06F 16/90335
USPC ...................................................... 707/737
See application file for complete search history.

(56) References Cited

U.S. PATENT DOCUMENTS

| | | | |
|---|---|---|---|
| 8,554,759 B1 | 10/2013 | Annau et al. | |
| 9,904,949 B1 | 2/2018 | Tavernier | |
| 10,319,041 B2 | 6/2019 | Chourasia et al. | |
| 10,324,937 B2 | 6/2019 | Yang et al. | |
| 10,949,475 B2 | 3/2021 | Guy et al. | |
| 11,895,138 B1* | 2/2024 | Talmor | H04L 63/1433 |
| 2006/0070004 A1* | 3/2006 | Miller | G06F 16/958 707/E17.116 |
| 2007/0244883 A1 | 10/2007 | Bessieres et al. | |
| 2008/0263005 A1 | 10/2008 | McLean et al. | |
| 2009/0063538 A1* | 3/2009 | Chitrapura | G06F 16/9566 707/999.102 |
| 2009/0204638 A1 | 8/2009 | Hollier et al. | |
| 2010/0037168 A1 | 2/2010 | Thayne et al. | |
| 2012/0191691 A1 | 7/2012 | Hansen | |
| 2014/0108373 A1 | 4/2014 | Abrahami et al. | |

(Continued)

OTHER PUBLICATIONS

Xu, Keyang, et al., "A Structure-Oriented Unsupervised Crawling Strategy for Social Media Sites", arXiv, document No. arXiv: 1804.02734v1, Cornell University, Apr. 8, 2018, 10 pages.*

Lin, Shian-Hua, et al., "Automatic sitemaps generation: Exploring website structures using block extraction and hyperlink analysis", Expert Systems with Applications, vol. 38, Issue 4, Apr. 2011, pp. 3944-3958.*

(Continued)

*Primary Examiner* — Robert Stevens
(74) *Attorney, Agent, or Firm* — FOLEY & LARDNER LLP (57) ABSTRACT

A system comprising one or more processors and one or more non-transitory computer-readable media storing computing instructions that, when executed on the one or more processors, cause the one or more processors to perform operations: classifying one or more webpages of a website into one or more classifications using interaction data, a content score, and a link equity score, each for the one or more webpages and removing, based on the one or more classifications, the one or more webpages from the website and from a sitemap of the website. Other embodiments are disclosed herein.

20 Claims, 5 Drawing Sheets

400

- 401 – Tracking interaction data for a webpage
- 402 – Determining a content score for a webpage
- 403 – Determining a link equity score for a webpage
- 404 – Classifying a webpage
- 405 – Removing a webpage from a sitemap

(56) References Cited

U.S. PATENT DOCUMENTS

| | | | |
|---|---|---|---|
| 2015/0350213 A1 | 12/2015 | Varadarajan et al. | |
| 2016/0048481 A1* | 2/2016 | Calvin | G06F 3/04842 |
| | | | 715/234 |
| 2016/0063065 A1 | 3/2016 | Khatri et al. | |
| 2016/0103861 A1 | 4/2016 | Jacob | |
| 2019/0325010 A1 | 10/2019 | Dakua | |
| 2021/0092144 A1* | 3/2021 | Qualls | G06F 21/577 |
| 2022/0245205 A1* | 8/2022 | Zhao | G06F 16/9035 |

OTHER PUBLICATIONS

Hassan, Rehab F., et al., "Improving the Web Indexing Quality through a Website-Search Engine Coactions", International Journal of Computer and Information Technology, vol. 3, Issue 2, Mar. 2014, pp. 285-291.*

Tanasa, Doru, et al., "Advanced Data Preprocessing for Intersites Using Web Usage Mining", IEEE Intelligent Systems, vol. 19, Issue 2, Mar.-Apr. 2004, pp. 59-65.

Cai, Rui, et al., "iRobot: An Intelligent Crawler for Web Forums", WWW 2008, Beijing, China, Apr. 21-25, 2008, pp. 447-456.

AHREFS—Marketing intelligence tools powered by big data. Retrieved from: https://ahrefs.com/ on Mar. 20, 2025, 16 pages.

"What is Link Equity?," AHREFS 2025 Retrieved from: https://ahrefs.com/seo/glossary/link-equity#:~:text=Link%20equity%20or%20%E2%80%9Clink%20juice,page%20is%20on%2C%20and%20more on Mar. 20, 2025, 6 pages.

Semrush—Online marketing can be easy. Retrieved from: https://www.semrush.com/ on Mar. 20, 2025, 5 pages.

Abouobaia, J., et al., Internal links: Ultimate Guide + Strategies. Semrush Blog. https://www.semrush.com/blog/internal-links/ Jan. 22, 2025, 37 pages.

"Majestic Maps and Categorizes the web". Majestic. Retrieved from: https://majestic.com/ on Mar. 20, 2025, 15 pages.

"An introduction to majestic trust flow," Majestic. Retrieved from: https://majestic.com/trust-flow on Mar. 20, 2025, 9 pages.

Moz. SEO Software for Smarter Marketing (Feb. 13, 2025). Retrieved from: https://moz.com/, 18 pages.

Free Backlink Checker—(Sep. 11, 2024) MOZ Link Explorer. Retrieved from: https://moz.com/link-explorer, 13 pages.

* cited by examiner

SYSTEMS AND METHODS FOR MAINTAINING A SITEMAP

CROSS REFERENCE TO RELATED APPLICATIONS

This application is a continuation of U.S. patent application Ser. No. 17/589,800, filed Jan. 31, 2022, which is incorporated by reference in its entirety.

TECHNICAL FIELD

This disclosure relates generally to managing a website and more particularly to maintaining a s sitemap of webpages for the website.

BACKGROUND

Websites are a backbone of modern communication technologies, but many times a specific website can be difficult to find. This is especially true for individual webpages within a website (e.g., an item webpage within a larger eCommerce website) because these webpages often have various paths, parameters, hashes, and other long strings of characters appended after the domain name. Due to this problem with complex uniform resource locators (URLs), many users of websites locate individual webpages they want to visit using a search engine to search for keywords in the webpage. Search engines then use a variety of metrics and algorithms to provide a user with a ranked list of webpages based on these keywords.

While most search engine algorithms are confidential, it is known that webpages listed in a sitemap for a website are more likely to be indexed by web crawlers run by a search engine server. This is especially applicable to higher quality webpages because they are ranked higher than lower quality webpages. A higher ranking, in turn, leads to more users finding and eventually navigating to the website.

In view of the above, there is a need for a system and method identifying and removing one or more low quality webpages from a sitemap.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform functions comprising: tracking interaction data for one or more webpages of a web site; determining a content score for the one or more webpages of the web site; determining a link equity score for the one or more webpages of the website; classifying the one or more webpages of the website into one or more classifications using the interaction data, the content score, and the link equity score; and removing the one or more webpages from a sitemap of the website based on the one or more classifications.

Various embodiments include a method. The method can be implemented via execution of computing instructions configured to run at one or more processors and configured to be stored at non-transitory computer-readable media The method can comprise tracking interaction data for one or more webpages of a website; determining a content score for the one or more webpages of the website; determining a link equity score for the one or more webpages of the website; classifying the one or more webpages of the website into one or more classifications using the interaction data, the content score, and the link equity score; and removing the one or more webpages from a sitemap of the website based on the one or more classifications.

Several embodiments include a system. A system including one or more processors and one or more non-transitory computer-readable media storing computing instructions that, when executed on the one or more processors, cause the one or more processors to perform certain acts. The acts can include classifying one or more webpages of a web site into one or more classifications using interaction data, a content score, and a link equity score, each for the one or more webpages. The acts also can include removing, based on the one or more classifications, the one or more webpages from the website and from a sitemap of the website.

Various embodiments include a method. The method being implemented via execution of computing instructions configured to run at one or more processors and configured to be stored at non-transitory computer-readable media. The method can include classifying one or more webpages of a website into one or more classifications using interaction data, a content score, and a link equity score, each for the one or more webpages. The method also can include removing, based on the one or more classifications, the one or more webpages from the website and from a sitemap of the website.

Figure 1:
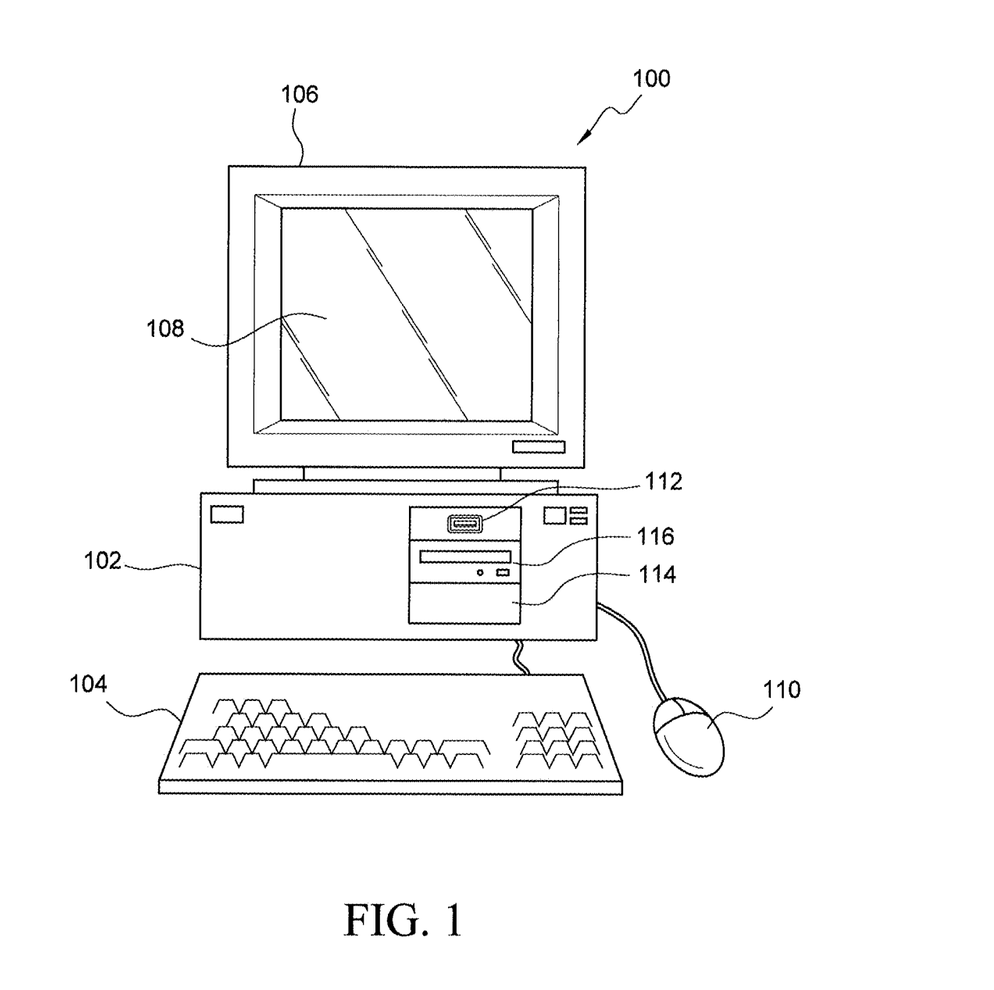
FIG. 1 illustrates a front elevational view of a computer system that is suitable for implementing various embodiments of the systems disclosed in FIGS. 3 and 5.
Figure 2:
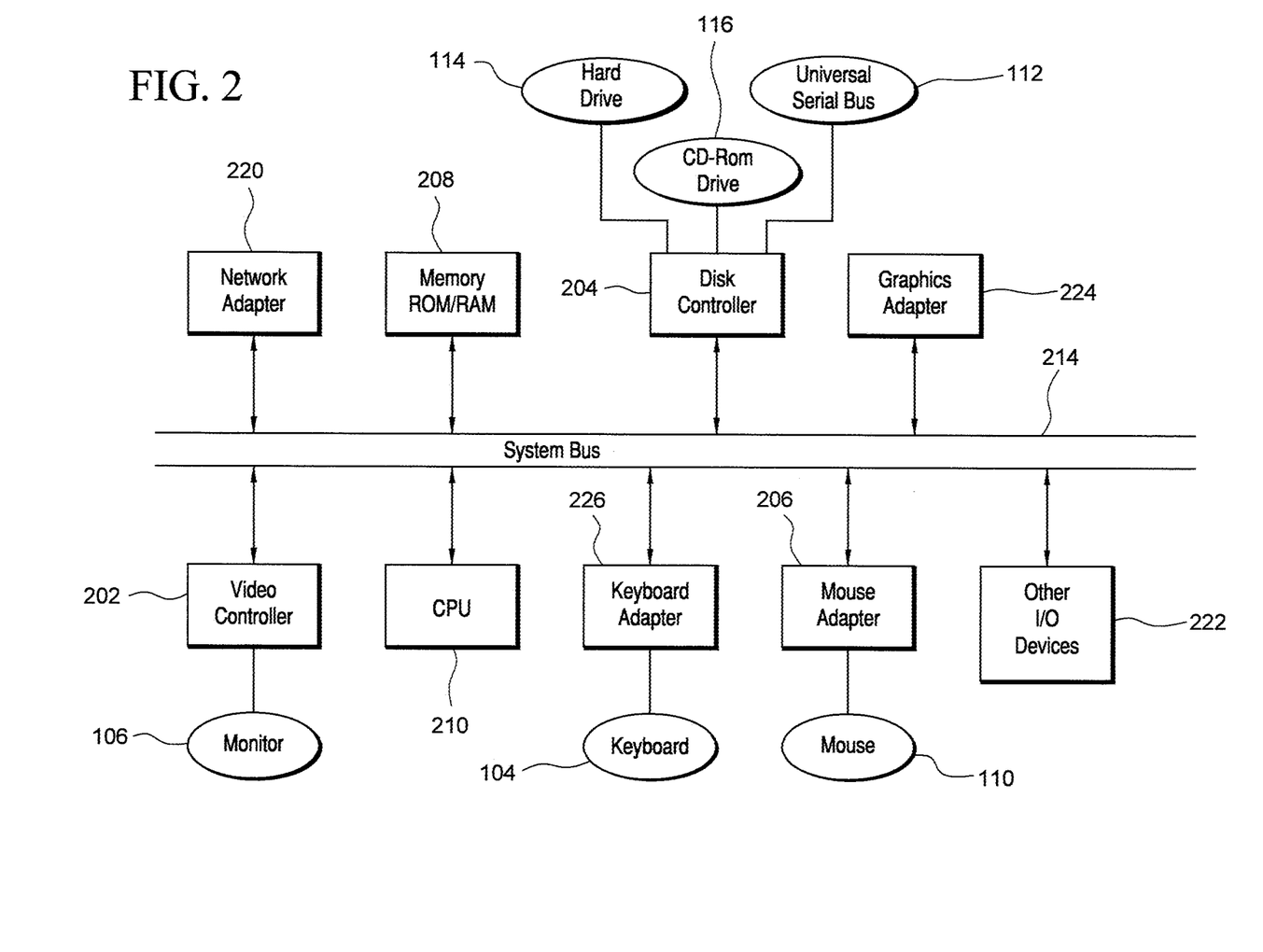
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
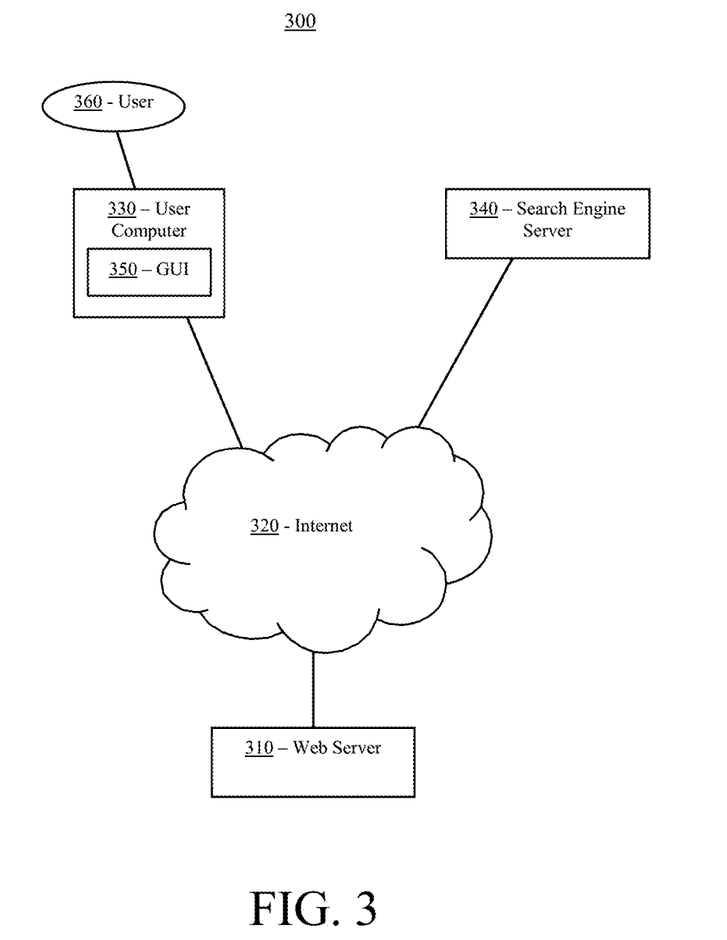
FIG. 3 illustrates a representative block diagram of a system, according to an embodiment.

Turning ahead in the drawings, FIG. 3 illustrates a block diagram of a system 300 that can be employed for improved online predictions, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 (or more than one web server), a user computer 330 (or more than one user computers), and/or a search engine server 340 (or more than one search engine server). In many embodiments, user computer 330, and/or search engine server 340 can be external to system 300. Web server 310, user computer 330, and/or search engine server 340 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310, user computer 330, and/or search engine server 340. Additional details regarding web server 310, user computer 330, and/or search engine server 340 are described herein.

User computer 330 can comprise any of the elements described in relation to computer system 100. In some embodiments, user computer 330 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computer 330 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 350. In the same or different embodiments, GUI 350 can be part of and/or displayed by user computer 330, which also can be part of system 300. In various embodiments, each user computer can have multiple GUIs. In some embodiments, GUI 350 can comprise text and/or graphics (image) based user interfaces. In the same or different embodiments, GUI 350 can comprise a heads up display ("HUD"). When GUI 350 comprises a HUD, GUI 350 can be projected onto a medium (e.g., glass, plastic, etc.), displayed in midair as a hologram, or displayed on a display (e.g., monitor 106 (FIG. 1)). In various embodiments, GUI 350 can be color, black and white, and/or greyscale. In many embodiments, GUI 350 can comprise an application running on a computer system, such as computer system 100 (FIG. 1), web server 310, user computer 330, and/or search engine server 340. In the same or different embodiments, GUI 350 can comprise a website accessed through internet 320. In some embodiments, GUI 350 can comprise an eCommerce website. In these or other embodiments, GUI 350 can comprise an administrative (e.g., back end) GUI allowing an administrator to modify and/or change one or more settings in system 300. In the same or different embodiments, GUI 350 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310, user computer 330, and/or search engine server 340 can be in data communication with each other through Internet 320. In certain embodiments, user computer 330 can be desktop computers, laptop computers, smart phones, tablet devices, and/or other endpoint devices. In various embodiments, web server 310 can host one or more websites. For example, web server 310 can host an eCommerce website that allows users to browse and/or search for products, to add products to an electronic shopping cart, and/or to purchase products, in addition to other suitable activities. In many embodiments, web server 310 can also be configured to generate one or more search engine marketing campaigns, as described in further detail below. For example, web server 310 can be configured to bid on search engine marking auctions managed by search engine server 340 and/or provide content to search engine server 340 for display in response to searches for keywords.

In some embodiments search engine server 340 can receive and process searches requested by user computer 330 and/or run one or more web crawlers to index web server 310. Generally speaking, search engine server 340 can run one or more web crawling programs configured to navigate, analyze, and index various websites. For example, a web crawler can index one or more webpages in an eCommerce website hosted on web server 310. In various embodiments, an analysis performed by search engine server 340 can determine a score and/or a rank for a webpage in connection with one or more keywords. This score or rank, then, dictates in which search result slot the webpage is shown, in response to a search for the keyword(s). In some embodiments, a web crawler can locate webpages to analyze by consulting a sitemap for the website.

In many embodiments, web server 310, user computer 330, and/or search engine server 340 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310, user computer 330, and/or search engine server 340 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, user computer 330, and/or search engine server 340. In a similar manner, the processing module(s) and the memory storage module(s) can be local and/or remote to each other.

Internet 320 can be an intranet that is not open to the public. In further embodiments, Internet 320 can be a mesh network of individual systems. Accordingly, in many embodiments, web server 310, (and/or the software used by such systems) can refer to a back end of system 300 operated by an operator and/or administrator of system 300, and user computer 330 (and/or the software used by such systems) can refer to a front end of system 300 used by one or more users 360, respectively. In some embodiments, user 360 can also be referred to as a customer, in which case, user computer 330 can be referred to as a customer computer. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310, user computer 330, and/or search engine server 340 also can be configured to communicate with one or more databases. The one or more databases can comprise a product database that contains information about products, items, or SKUs (stock keeping units) sold by a retailer. In many embodiments, one or more databases can comprise information about interactions of user computer 330 with GUI 350. For example, the one or more databases can store past (e.g., historical) interactions of user computer 330 with GUI 350. These interactions can be tied to a unique identifier (e.g., an IP address, an advertising ID, device ID, etc.) and/or a user account. In embodiments where a user 360 interacts with GUIs 350 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, user computer 330, and/or search engine server 340, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for maintaining a sitemap. These techniques described herein can provide a significant improvement over conventional approaches of maintaining a sitemap, such as manually removing webpages. In many embodiments, the techniques described herein can beneficially make determinations based on dynamic information that describes current conditions and/or conditions that have occurred during the same day as the analysis.

In a number of embodiments, the techniques described herein can solve a technical problem that arises only within the realm of computer networks, as a sitemap does not exist outside the realm of computer networks.

Figure 4:
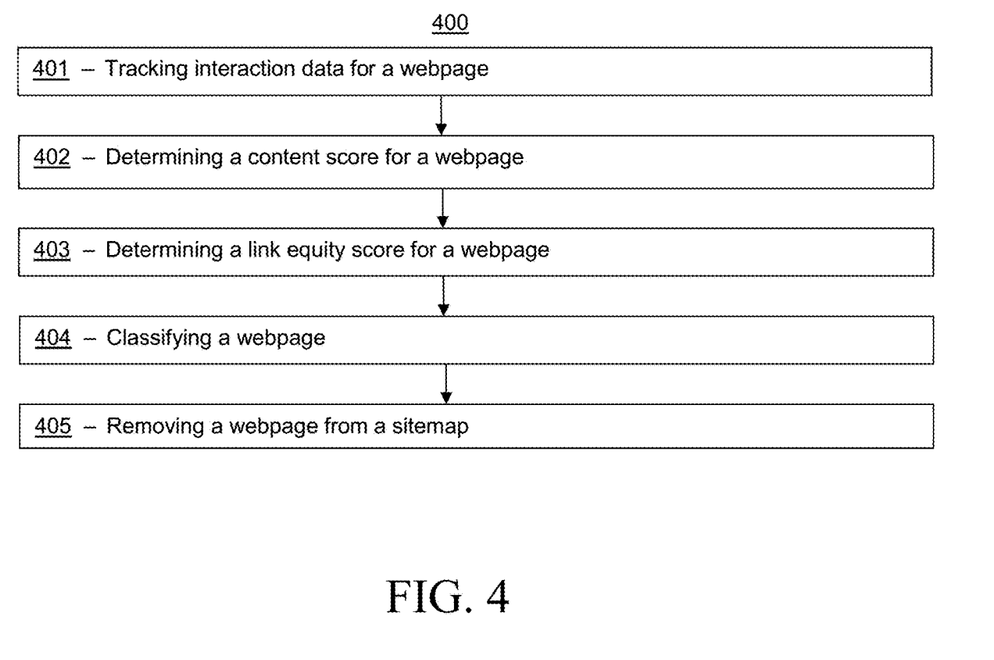
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3). The processing module(s) can be similar or identical to the processing module(s) described above with respect to computer system 100 (FIG. 1).

In many embodiments, method 400 can comprise an activity 401 of tracking interaction data for a webpage. Generally speaking, a webpage can comprise a sub-domain, and a website can comprise a higher level domain. For example, a webpage can be for a specific item offered for sale on an eCommerce web site or marketplace, while a website can be the entire eCommerce marketplace. In many embodiments, interaction data can be collected from one or more GUIs displayed on one or more user computers (e.g., GUI 350 (FIG. 3)). In some embodiments, user interaction data can be stored as described above with respect to system 300 (FIG. 3).

In many embodiments, in-session user activity can be tracked. In various embodiments, in-session user activity can comprise interactions with a GUI that occur during a user session. For example, in-session user activity can comprise interactions with a website during a browsing session on the website. As another example, in-session user activity can comprise interactions with a computer program that occur beginning from when the program (e.g., the GUI or the website) is opened to when the program is closed. It will be understood that while many user sessions end when a GUI is closed (e.g., by navigating away from a website or closing a program), user sessions can persist after closure of the GUI. For example, it can be considered one user session when a user opens a GUI, closes the GUI, and then a short time later re-opens the GUI from the same internet browser instance and/or from the same user computer. What is considered a user session can be determined by an administrator of system 300 (FIG. 3) based on the specific needs or requirements of the system and its administrator. In many embodiments, in-session user activity can be continually streamed to a database and/or a cache of system 300 (FIG. 3) for storage and further processing.

In many embodiments, method 400 can comprise an activity 402 of determining a content score for a webpage. In many embodiments, the webpage of activity 402 can be the same webpage of activity 401. Generally speaking, a value of a content score for a webpage can correlated with a quality of content (e.g., text and/or images) displayed on the webpage. For example, a higher content score can indicate that images are high resolution on a webpage. In many embodiments, a content score can be determined using one or more of a text analysis and/or an image analysis. In many embodiments a text analysis can comprise a natural language processing (NLP) algorithm. In various embodiments, a NLP algorithm can be configured to output a metric associated with readability of text and/or grammatical structure of text. In some embodiments, a text analysis can assign a low score to an item with a bullet point description. In many embodiments, an image analysis can comprise checking one or more of a resolution of one or more images on a webpage and/or a number or quantity of the one or more images on a webpage. In some embodiments, a higher content score can be generated when a resolution of images and/or a number or quantity of images on a webpage are above their respective predetermined thresholds.

In many embodiments, method 400 can comprise an activity 403 of determining a link equity score for a webpage. In many embodiments, the webpage of activity 403 can be the same webpage of activities 401 and 402. Generally speaking, webpages that are easier to navigate have a higher link equity score. One way of increasing a navigability of a webpage is to insert links to other webpages in the same website. There are a number of different ways of calculating and/or increasing a link equity score. One exemplary embodiment can be found in application Ser. No. 17/163,490; filed Jan. 31, 2021, which is incorporated herein by this reference in its entirety.

In many embodiments, method 400 can comprise an activity 404 of classifying a webpage. In many embodiments, the webpage of activity 403 can be the same webpage of activities 401, 402 and 403. In various embodiments, a webpage can be classified into one or more predicted ranking ranges for a search results page. For example, a webpage can be classified into a first ranking range comprising rankings from a first search result position to a fifth search result position, a second ranking range comprising rankings after the fifth search result position, or a third ranking range comprising no rankings.

In many embodiments, a logistic regression can be used to classify a webpage. Generally speaking, a logistic regression can be a statistical model that, in its basic form, uses a logistic function to model a binary dependent variable. A number of more complex logistic regressions also exist. For example, a multinomial logistic regression can be used to classify a webpage. Generally speaking, multinomial logistic regression can be a classification method that generalizes a logistic regression to multiclass problem (e.g., a problem having more than two possible discrete outcomes). In other words, a multinomial logistic regression can be used to predict probabilities of different possible outcomes (e.g., ranking ranges) of a categorically distributed dependent variable, given a set of independent variables. In some embodiments, a multinomial logistic regression can estimate a probability of indexation by a search engine server and a likely ranking for that indexation. A logistic regression can have a number of inputs. For example, interaction data, a content score, and a link equity score, an age of the one or more webpages, and pricing information for an item displayed on the one or more webpages can all be used as input for a logistic regression model. In many embodiments, when a content score increases or a page quality score increases, a probability of a higher rank can increase and a probability of not being indexed can decrease. In some embodiments, using a logistic regression can comprise selecting a rank range with a largest probability. In various embodiments, when an item's inventory is out of stock, a probability of a higher rank can decrease and a probability of not being indexed can increase. In further embodiments, a visit count or a link equity score increases, a probability of a higher rank can increase and a probability of not being indexed can decrease. In these or other embodiments, when a price ratio is too large, a probability of a higher rank can decrease and a probability of a low or no ranking can increase.

In various embodiments, a logistic regression model can use an equation comprising:

$$P(y=i\,|\,x,\theta) = \frac{e^{\theta_i^T x}}{\sum_j^K e^{\theta_j^T x}}$$

$$i = \begin{cases} 0\text{:no ranking} \\ 1\text{:ranked from first to fifth position, where} \\ 2\text{:ranked after fifth position} \end{cases}$$

$\theta^T x = \theta_0 + \theta_1\text{ age} + \theta_{21}\text{ inventory }(t) +$ $\quad \theta_{22}\text{ inventory }(t-1) + \theta_3\text{visit\_count} + \theta_{41}\text{ price\_multiple }(t) +$ $\quad \theta_{42}\text{price\_multiple}(t-1) + \theta_5\text{Content\_score} + \theta_6\text{link\_equity}$ In many embodiments, $\theta^T x$ can comprise a vector format of a formula, $\theta$ is a row vector, and X is a vector of inputs. In various embodiments, an age can comprise a number of days between a webpage create date and a current date (t). In some embodiments, inventory(t) can comprise a binary variable indicating whether an item is out of stock online and in store for a year. In these or other embodiments, Inventory (t−1): if out of stock online and in store for a year one month ago. In some embodiments, visit count can comprise a count of visits from unique users and/or total visits to the webpage for at least one year. In further embodiments, price_multiple (t) can comprise a minimum price in a month divided by a maximum competitor price in the month. In many embodiments, price_multiple(t−1) can comprise the price_multiple from one month ago (i.e., the minimum price from one month ago divided by the maximum competitor price from one month ago). In some embodiments Content score can comprise a content score for a webpage, as described above. In these or other embodiments, link_equity can comprise a link equity score for a webpage, as described above.

In many embodiments, method 400 can comprise an activity 405 of removing a webpage from a sitemap. In some embodiments, activity 405 can be performed when a webpage is ranked outside of the first ranking range (e.g., the webpage has no ranking and/or is ranked after the fifth position). In various embodiments, a webpage can be removed from a sitemap by removing a URL of an item from a list and/or index of webpages in the sitemap.

Figure 5:
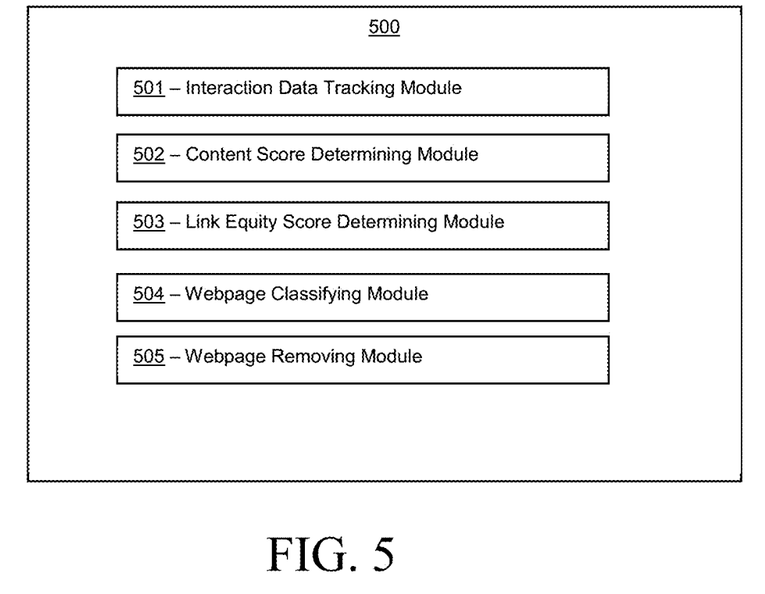
FIG. 5 illustrates a representative block diagram of a system, according to an additional embodiment.

Turning ahead in the drawings, FIG. 5 illustrates a block diagram of a system 500 that can be employed for maintaining a sitemap. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500. In some embodiments, one or more portions of system 500 can be part of or in communication with web server 310 (FIG. 3), search engine server 340 (FIG. 3), and/or user computer 330. (FIG. 3).

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as interaction data tracking module 501. In many embodiments, interaction data tracking module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as content score determining module 502. In many embodiments, content score determining module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as link equity score determining module 503. In many embodiments, link equity score determining module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as webpage classifying module 504. In many embodiments, webpage classifying module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as webpage removing module 505. In many embodiments, webpage removing module 505 can store computing instructions configured to run on one or more processing modules and perform one or more acts of method 400 (FIG. 4) (e.g., activity 405 (FIG. 4)).

Although systems and methods for maintaining a sitemap have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory computer-readable media storing computing instructions that, when executed on the one or more processors, cause the one or more processors to perform operations comprising:
        classifying one or more webpages of a website into one or more classifications using interaction data, a content score, and a link equity score, each for the one or more webpages; and
        removing, based on the one or more classifications, the one or more webpages from the website and from a sitemap of the website.

2. The system of claim 1, wherein the one or more classifications comprise a ranking range of one or more predicted ranking ranges for the one or more webpages of the website.

3. The system of claim 2, wherein the one or more predicted ranking ranges comprise:
    a first ranking range comprising predicted rankings from a first predicted search result position to a fifth predicted search result position;
    a second ranking range comprising predicted rankings after the fifth predicted search result position; and
    a third ranking range comprising no predicted rankings.

4. The system of claim 3, wherein removing the one or more webpages from the sitemap of the website comprises:
    removing the one or more webpages from the sitemap when the one or more webpages are classified in the third ranking range.

5. The system of claim 1, wherein classifying the one or more webpages comprises:
    feeding the interaction data, the content score, and the link equity score into a logistic regression model; and
    classifying the one or more webpages of the website into the one or more classifications using the logistic regression model.

6. The system of claim 5, wherein the logistic regression model comprises a multinomial logistic regression model.

7. The system of claim 1, wherein classifying the one or more webpages comprises:
    classifying the one or more webpages of the website into the one or more classifications using the interaction data, the content score, the link equity score, an age of the one or more webpages, and pricing information for an item displayed on the one or more webpages.

8. The system of claim 1, wherein the computing instructions, when executed on the one or more processors, cause the one or more processors to further perform an operation comprising:
    determining the content score using a text analysis and an image analysis performed on the one or more webpages of the website.

9. The system of claim 8, wherein the text analysis comprises a natural language processing algorithm.

10. The system of claim 8, wherein the image analysis comprises:
    checking a resolution of one or more images displayed on the one or more webpages against one or more resolution thresholds; and
    checking a quantity of the one or more images displayed on the one or more webpages against one or more image quantity thresholds.

11. A method being implemented via execution of computing instructions configured to run at one or more processors and configured to be stored at non-transitory computer-readable media, the method comprising:
    classifying one or more webpages of a website into one or more classifications using interaction data, a content score, and a link equity score, each for the one or more webpages; and
    removing, based on the one or more classifications, the one or more webpages from the website and from a sitemap of the website.

12. The method of claim 11, wherein the one or more classifications comprise a ranking range of one or more predicted ranking ranges for the one or more webpages of the website.

13. The method of claim 12, wherein the one or more predicted ranking ranges comprise:
   a first ranking range comprising predicted rankings from a first predicted search result position to a fifth predicted search result position;
   a second ranking range comprising predicted rankings after the fifth predicted search result position; and
   a third ranking range comprising no predicted rankings.

14. The method of claim 13, wherein removing the one or more webpages from the sitemap of the website comprises:
   removing the one or more webpages from the sitemap when the one or more webpages are classified in the third ranking range.

15. The method of claim 11, wherein classifying the one or more webpages comprises:
   feeding the interaction data, the content score, and the link equity score into a logistic regression model; and
   classifying the one or more webpages of the website into the one or more classifications using the logistic regression model.

16. The method of claim 15, wherein the logistic regression model comprises a multinomial logistic regression model.

17. The method of claim 11, wherein classifying the one or more webpages comprises:
   classifying the one or more webpages of the website into the one or more classifications using the interaction data, the content score, the link equity score, an age of the one or more webpages, and pricing information for an item displayed on the one or more webpages.

18. The method of claim 11 further comprising:
   determining the content score using a text analysis and an image analysis performed on the one or more webpages of the website; and
   wherein at least one of:
   (a)
      the text analysis comprises a natural language processing algorithm; or
   (b)
      the image analysis comprises:
         checking a resolution of one or more images displayed on the one or more webpages against one or more resolution thresholds; and
         checking a quantity of the one or more images displayed on the one or more webpages against one or more image quantity thresholds.

19. A non-transitory computer-readable medium storing instructions, wherein the instructions, upon execution by a processor, cause the processor to perform operations comprising:
   classifying one or more webpages of a website into one or more classifications using interaction data, a content score, and a link equity score, each for the one or more webpages; and
   removing, based on the one or more classifications, the one or more webpages from the website and from a sitemap of the website.

20. The non-transitory computer-readable medium of claim 19, wherein the operations further comprise:
   determining the content score using a text analysis and an image analysis performed on the one or more webpages of the website.

* * * * *